(12) United States Patent
Yi et al.

(10) Patent No.: US 12,551,402 B2
(45) Date of Patent: Feb. 17, 2026

(54) METHOD OF DISPLAYING LOCATIONS OF ACUPUNCTURE POINTS IN HUMAN BODY USING ARTIFICIAL INTELLIGENCE

(71) Applicant: Pukyong National University Industry—University Cooperation Foundation, Busan (KR)

(72) Inventors: Myunggi Yi, Busan (KR); Jaewoong Han, Busan (KR); Byeong-Il Lee, Busan (KR)

(73) Assignee: PUKYONG NATIONAL UNIVERSITY INDUSTRY—UNIVERSITY COOPERATION FOUNDATION, Busan (KR)

( * ) Notice: Subject to any disclaimer, the term of this patent is extended or adjusted under 35 U.S.C. 154(b) by 151 days.

(21) Appl. No.: 18/384,157

(22) Filed: Oct. 26, 2023

(65) Prior Publication Data

US 2024/0173207 A1    May 30, 2024

(30) Foreign Application Priority Data

Nov. 28, 2022    (KR) .......................... 10-2022-0161163

(51) Int. Cl.
*A61H 39/02*    (2006.01)
*A61B 90/00*    (2016.01)

(52) U.S. Cl.
CPC .............. *A61H 39/02* (2013.01); *A61B 90/36* (2016.02); *A61B 2090/365* (2016.02)

(58) Field of Classification Search
CPC ............ A61H 39/02; A61H 2201/5043; A61B 90/36; A61B 2090/365; A61B 90/361;
(Continued)

(56) References Cited

U.S. PATENT DOCUMENTS

2004/0111128 A1*    6/2004    Wang ..................... A61H 39/02
607/46

FOREIGN PATENT DOCUMENTS

CN    107041840 A    8/2017
CN    109091380 A    12/2018
(Continued)

OTHER PUBLICATIONS

Z. Liang, G. Zhang, Z. Li, J. Yin and W. Fu, "Deep learning for acupuncture point selection patterns based on veteran doctor experience of Chinese medicine," 2012 IEEE International Conference on Bioinformatics and Biomedicine Workshops, Philadelphia, PA, USA, 2012, pp. 396-401, (Year: 2012).*

(Continued)

*Primary Examiner* — Daniel F Hajnik
*Assistant Examiner* — Thomas John Foster
(74) *Attorney, Agent, or Firm* — Harness, Dickey & Pierce, P.L.C.

(57) ABSTRACT

The present disclosure relates to a method of displaying locations of acupuncture points in the human body using artificial intelligence and may provide a method of displaying locations of acupuncture points in the human body, which may convert the sizes of the joint points from an artificial intelligence deep-learning model (e.g., MediaPipe, etc.) to fit the subject body, calculate locations of acupuncture points on the hands, feet, face, body, etc. through vector calculation of the joint points, and display the same in real-time image on the subject body in augmented reality.

8 Claims, 11 Drawing Sheets

(58) Field of Classification Search
CPC .... A61B 5/4854; G06N 20/00; G06N 3/0464; G16H 30/20; G16H 30/40; G06T 19/006; G06T 11/00; G06F 3/011
See application file for complete search history.

(56) References Cited

FOREIGN PATENT DOCUMENTS

| | | | | |
|---|---|---|---|---|
| CN | 106859956 B | * | 11/2019 | ............ A61H 39/02 |
| CN | 115205208 A | | 10/2022 | |
| CN | 115227569 A | | 10/2022 | |
| KR | 10-1780319 B1 | | 9/2017 | |
| KR | 10-2263249 B1 | | 6/2021 | |
| TW | 1629662 B | * | 11/2018 | ............ A61H 39/02 |
| WO | 2022102863 A1 | | 5/2022 | |

OTHER PUBLICATIONS

English Translation of Lin (Chinese document CN 115205208) (Year: 2022).*
Office Action from corresponding Korean Patent Application No. 10-2022-0161163, issued on Mar. 12, 2025.
Decision to Grant of the KR priority application No. 10-2022-0161163 issued on Oct. 29, 2025.

* cited by examiner

METHOD OF DISPLAYING LOCATIONS OF ACUPUNCTURE POINTS IN HUMAN BODY USING ARTIFICIAL INTELLIGENCE

CROSS-REFERENCE TO RELATED APPLICATION

This application is based on and claims priority under 35 U.S.C. 119 to Korean Patent Application No. 10-2022-0161163, filed on Nov. 28, 2022, in the Korean Intellectual Property Office, the disclosure of which is herein incorporated by reference in its entirety.

FIELD

The present invention relates to a method of displaying locations of acupuncture points in the human body and, in particular, to a method for displaying locations of acupuncture points in the human body using an artificial intelligence deep-learning model.

BACKGROUND

Acupuncture points are on the body's meridian circulation paths and indicate places where acupuncture or moxibustion is performed in oriental medicine, and most of the conventional technologies provide the locations of acupuncture points on the body surface based on a three-dimensional model.

However, such conventional technologies cannot display the exact locations depending on the height, weight, etc. of the subject, such as a patient, so even experts such as oriental medicine doctors have difficulty in finding or marking the exact acupuncture points directly on the subject's hands, feet, face, body, or the like.

As prior literature, Korean Patent Application No. 10-2017-0035072 (Mar. 21, 2017), Korean Patent Application No. 10-2019-0050736 (Apr. 30, 2019), and the like may be referred to.

SUMMARY

The present disclosure has been made in order to solve the above-mentioned problems and an aspect of the present disclosure is to provide a method of displaying locations of acupuncture points in the human body, which may convert the sizes of joint points from an artificial intelligence deep-learning model (e.g., MediaPipe or the like) to fit the subject's body, calculate the locations of acupuncture points on the hands, feet, face, body, etc. through vector calculation of the joint points, and display the same in augmented reality on the subject's body through a real-time image.

In view of the foregoing, a method of displaying locations of acupuncture points for a subject in an acupuncture point location display device according to one aspect of the present disclosure may include receiving a subject image, receiving joint point location vectors of a subject body from a joint model, converting the joint point location vectors to correspond to the size of the subject body of the subject image on a display where the subject image and the joint point location vectors are displayed, calculating acupuncture point location vectors for the converted joint point location vectors with reference to a table in a database, and displaying locations of acupuncture points according to the acupuncture point location vectors in real time on the body of the subject image in augmented reality on a display on which the subject image is displayed.

The joint model may be an artificial intelligence deep-learning model in which the joint point location vectors are machine-learned for multiple human bodies by operating a library to provide the joint point location vectors, and may provide the joint point location vectors according to a request of the acupuncture point location display device.

The calculating of the acupuncture point location vectors may include calculating the acupuncture point location vectors with reference to information about the sum, inner division, outer division, or inner product of joint point location vectors associated with corresponding locations of acupuncture points, among the joint point location vectors, in the table of the database.

The displaying in augmented reality may include converting the acupuncture point location vectors so as to dynamically respond to changes in the subject body of the subject image on the display where the subject image is displayed and displaying the locations of acupuncture points according to the converted acupuncture point location vectors in real time on the body of the subject image in augmented reality.

The joint point location vectors and the acupuncture point location vectors may be vectors on a three-dimensional rectangular coordinate system.

In addition, a non-transitory computer-readable storage medium storing computer executable instructions for performing a function of displaying locations of acupuncture points for a subject in an acupuncture point location display device according to another aspect of the present disclosure may implement a function of receiving joint point location vectors of a subject body from a joint model, a function of receiving a subject image, a function of converting the joint point location vectors to correspond to the size of the subject body of the subject image on a display where the subject image and the joint point location vectors are displayed, a function of calculating acupuncture point location vectors for the converted joint point location vectors with reference to a table in a database, and a function of displaying locations of acupuncture points according to the acupuncture point location vectors in real time on the subject body of the subject image in augmented reality on a display on which the subject image is displayed.

According to a method of displaying locations of acupuncture points of the present disclosure, it is possible to convert the sizes of joint points from an artificial intelligence deep-learning model (e.g., MediaPipe, which is one of the Human Pose Estimation models, or the like) to fit the subject's body, calculate standard locations of acupuncture points, which are determined by the World Health Organization/Western Pacific Regional Office (WHO/WPRO), on the hands, feet, face, body, etc. through vector calculation of the joint points, and display the same in augmented reality on the subject's body through a real-time image, so that the experts such as oriental medicine doctors and the like may easily use this for diagnosis and treatment.

As described above, when the locations of acupuncture points are quantified to be customized and scientifically provided to the experts such as oriental medicine doctors and the like, it is easier to determine the locations of acupuncture points, and if the acupuncture points are displayed through a real-time image for education of new oriental medical doctors and the like, it may be a great help in establishing the concept of standard acupuncture points more clearly. It is also expected to help with quantification and scientification of oriental medicine, which are weak areas thereof.

BRIEF DESCRIPTION OF THE DRAWINGS

The accompanying drawings, which are included as part of the detailed description to help understanding of the present disclosure, provide embodiments of the present disclosure and explain the technical idea of the present disclosure along with the detailed description.

DETAILED DESCRIPTION

Figure 1:
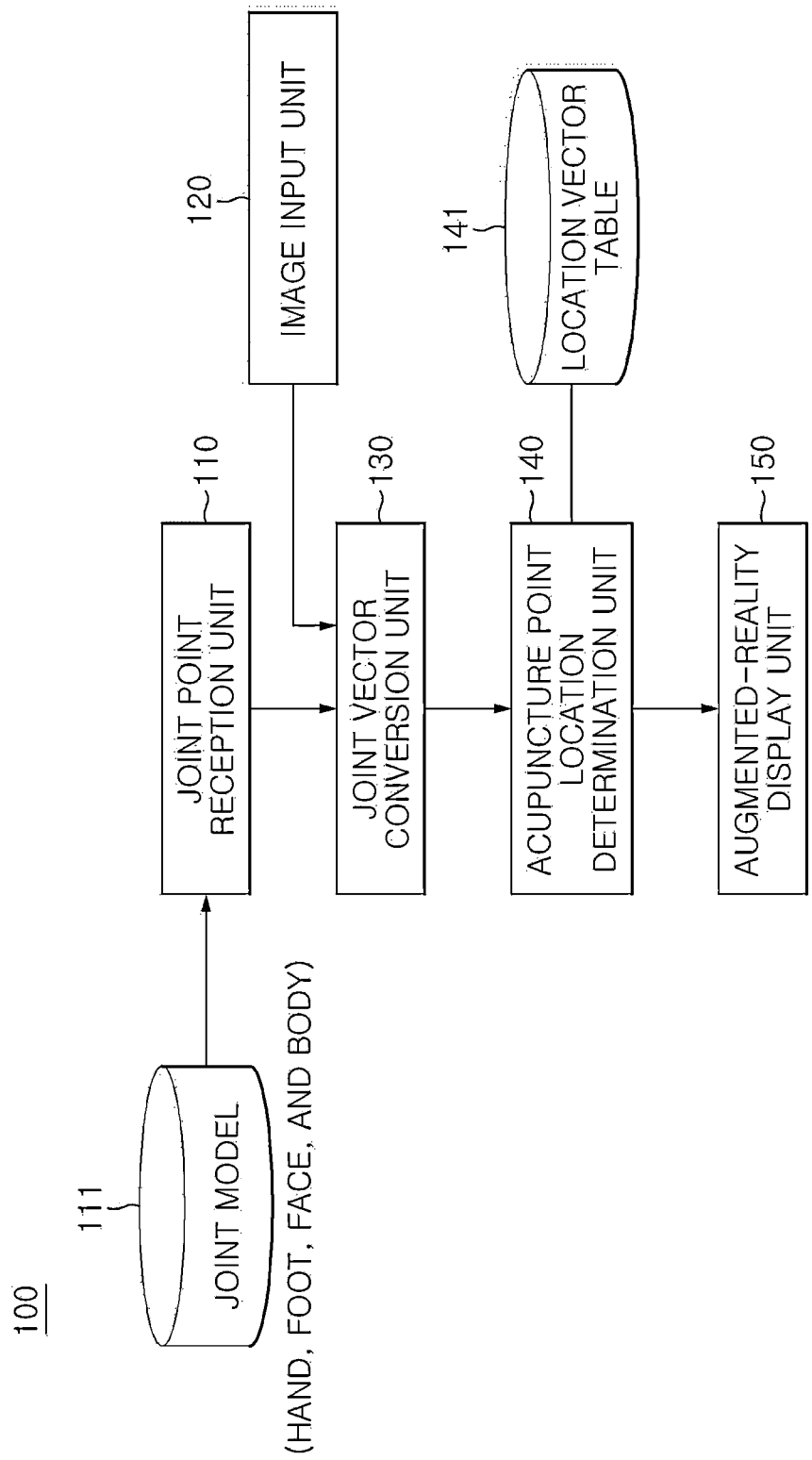
FIG. 1 is a diagram illustrating an acupuncture point location display device according to an embodiment of the present disclosure.

Hereinafter, the present disclosure will be described in detail with reference to the attached drawings. Here, the same elements in the respective drawings will be possibly indicated by the same reference numerals. In addition, detailed descriptions of already known functions and/or configurations will be omitted. Description below will focus on the parts necessary to understand operations according to various embodiments, and descriptions of elements that may obscure the gist of the explanation will be omitted. In addition, some elements may be exaggerated, omitted, or shown schematically in the drawings. The size of each element does not entirely reflect the actual size, so the descriptions herein are not limited to the relative sizes or spacing of the elements shown in the respective drawings.

In describing the embodiments of the present disclosure, a detailed description of the known technology related to the present disclosure, which may unnecessarily obscure the subject matter of the present disclosure, will be omitted. In addition, the terms described below are defined in consideration of functions in the present disclosure, and may vary depending on the intention or custom of the user or operator. Therefore, the definition thereof should be made based on the description throughout this specification. The terms used in the detailed description are merely intended to describe the embodiments of the present disclosure and should not be limited to specific meanings. Unless explicitly stated otherwise, singular forms include plural meanings. In this description, expressions such as "comprising" or "including" are intended to indicate certain features, numbers, steps, operations, elements, and some or combinations thereof, and should not be construed to exclude the existence or possibility of one or more features, numbers, steps, operations, elements, and some or combinations, other than those described.

In addition, although terms such as "first", "second", etc. may be used to describe various elements, the elements are not limited to the terms, and the terms are used only for the purpose of distinguishing one element from another element.

FIG. 1 is a diagram illustrating an acupuncture point location display device 100 according to an embodiment of the present disclosure.

Referring to FIG. 1, the acupuncture point location display device 100 according to an embodiment of the present disclosure may include a joint point reception unit 110 for providing joint point location vectors, a joint point provision unit 111 for providing joint point location vectors upon request, an image input unit 120 for receiving subject images from a camera, a joint vector conversion unit 130 for converting the joint point location vectors to correspond to the size of a subject body of the subject image on a display, a database 141 storing table information about the sum, inner division, outer division, or inner product of the joint point location vectors, an acupuncture point location determination unit 140 for calculating acupuncture point location vectors for the converted joint point location vectors with reference to the table in the database, and an augmented-reality display unit 150 for displaying, on the display, the locations of acupuncture points according to the acupuncture point location vectors in real time on the subject body of the subject image in augmented reality.

Although not shown in the drawing, the acupuncture point location display device 100 may include a display device such as an LCD, LED, or the like for displaying the subject image and the locations of acupuncture points. The acupuncture point location display device 100 is a device configured to display the locations of acupuncture points for the subject on the display screen of a user terminal such as a smartphone, laptop PC, desktop PC, or the like, and may be configured as hardware, software, or a combination thereof, as will be further explained in FIG. 8.

The joint point reception unit 110 may receive joint point location vectors of the subject body from a joint model. The joint point reception unit 110 may make a request for joint point location vectors of the subject body to the joint point provision unit 111 whenever necessary, and thus the joint point provision unit 111 may provide the same from the joint model of the human body. The joint point location vectors may be information about vectors on a three-dimensional rectangular coordinate system for display on a display.

The joint point provision unit 111 may operate an artificial intelligence deep-learning model, as the joint model, which performs machine learning about joint point location vectors for all or some of the human body's hands (or including arms), feet (or including legs), face, trunk (or torso), and the like. The joint point provision unit 111 may operate a library to provide the joint point location vectors and perform machine learning of the artificial intelligence deep-learning model for the joint point location vectors for multiple human bodies, thereby possessing the learned artificial intelligence deep-learning model. At the request of the joint point reception unit 110, the joint point provision unit 111 may provide joint point location vectors for the subject body, such as all or some of the human body's hands (or including arms), feet (or including legs), face, trunk (or torso), and the like through the learned artificial intelligence deep-learning model.

The joint point provision unit 111 may be operated within the acupuncture point location display device 100 or may be a system operated on the Internet. For systems operating on the Internet, joint point location vectors may be provided by requesting and receiving information using a data transmission/reception interface such as an open API (Application Program Interface). For example, in the case of operating the learned artificial intelligence deep-learning model (e.g., MediaPipe hand model, MediaPipe Face model, etc.) using a Python library called MediaPipe on a server (e.g., Google) on the Internet, the joint point provision unit 111 may provide joint point location vectors for the subject body, such as all or some of the human body's hands (or including arms), feet (or including legs), face, trunk (or torso), and the like may be requested and received.

Meanwhile, the image input unit 120 may receive a subject image. The image input unit 120 may receive, as the subject image, a still image or moving image. The image input unit 120 may receive still images or moving images directly from a camera (e.g., a 3D camera), and in some cases, may receive still images or moving images previously stored in memory or the like. Here, it is desirable that the still image or moving image be three-dimensional image information including depth information, but in some cases, 2D image information may be used. The sequence of receiving, by the joint point reception unit 110, the joint point location vectors of the subject body from the joint model and receiving, by the image input unit 120, the subject image do not matter, so any operation may come first. The receiving, by the image input unit 120, the subject image may be performed earlier than the receiving, by the joint point reception unit 110, the joint point location vectors of the subject body from the joint model.

The joint vector conversion unit 130 may convert the joint point location vectors to correspond to the size of the subject body of the subject image on the display where the subject image and the joint point location vectors are displayed.

Figure 2:
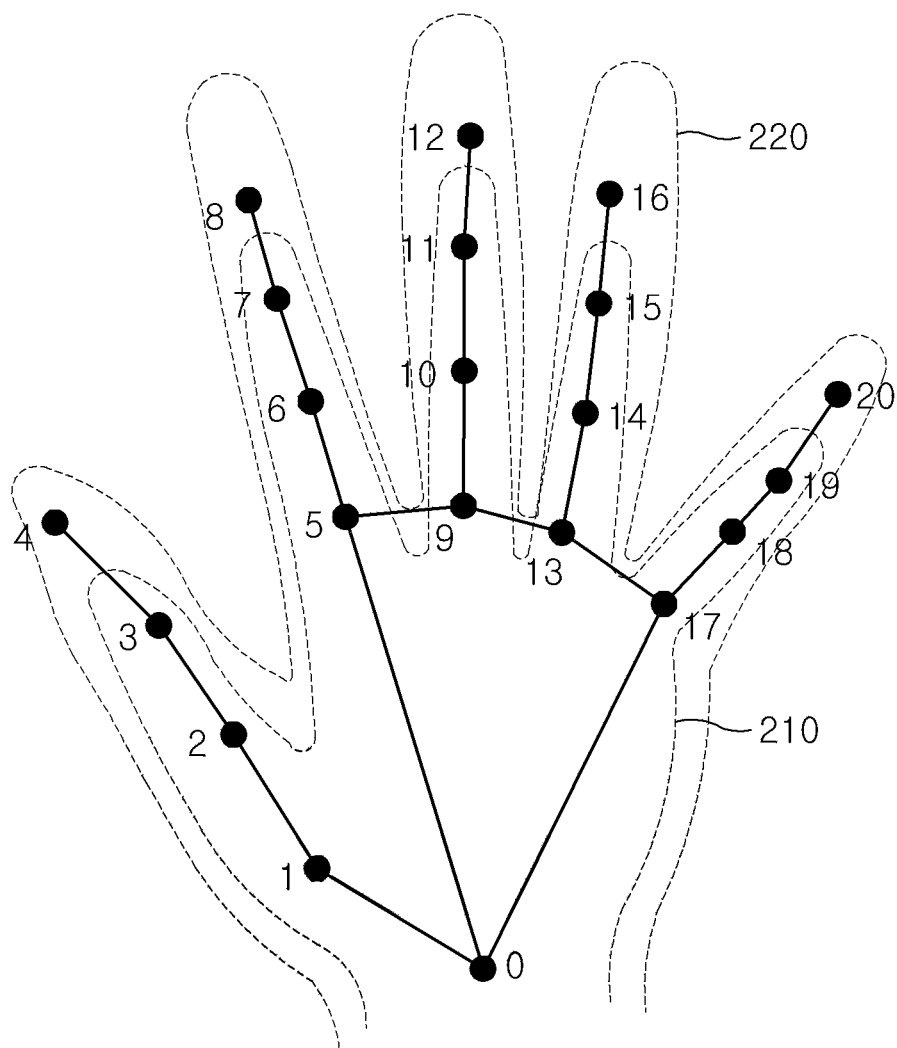
FIG. 2 is a diagram illustrating the conversion of joint point location vectors to correspond to the size of a subject body of a subject image in the present disclosure.

FIG. 2 is a diagram illustrating the conversion of joint point location vectors to correspond to the size of a subject body (e.g., hand) of a subject image in the present disclosure.

Referring to FIG. 2, when joint point location vectors provided from the joint point provision unit 111 are given as 0, 1, 2, 3, . . . as shown in FIG. 2, the size of the subject body (e.g., hand) by the joint point location vectors displayed on the display may be different from the size 210 or 220 of the subject body (e.g., hand) of the subject image displayed on the display, and accordingly, in order to correct this, the joint vector conversion unit 130 may convert the joint point location vectors (e.g., transform of coordinates) so as to fit the size of the subject body of the subject image. Here, although the conversion of the joint point location vectors for the hand is illustrated, the present disclosure is not limited thereto, and the joint point location vectors for the subject body, such as all or some of the human body's hands (or including arms), feet (or including legs), face, trunk (or torso), and the like may be converted (e.g., transform of coordinates) so as to fit the size of the subject body of the subject image in a similar manner to the above.

The acupuncture point location determination unit 140 may calculate acupuncture point location vectors for the converted joint point location vectors with reference to a table in the database 141. The database 141 may store table information about the sum, inner division, outer division, or inner product of joint point location vectors. The acupuncture point location vectors may be information about vectors on a three-dimensional rectangular coordinate system for display on the display.

Figure 3:
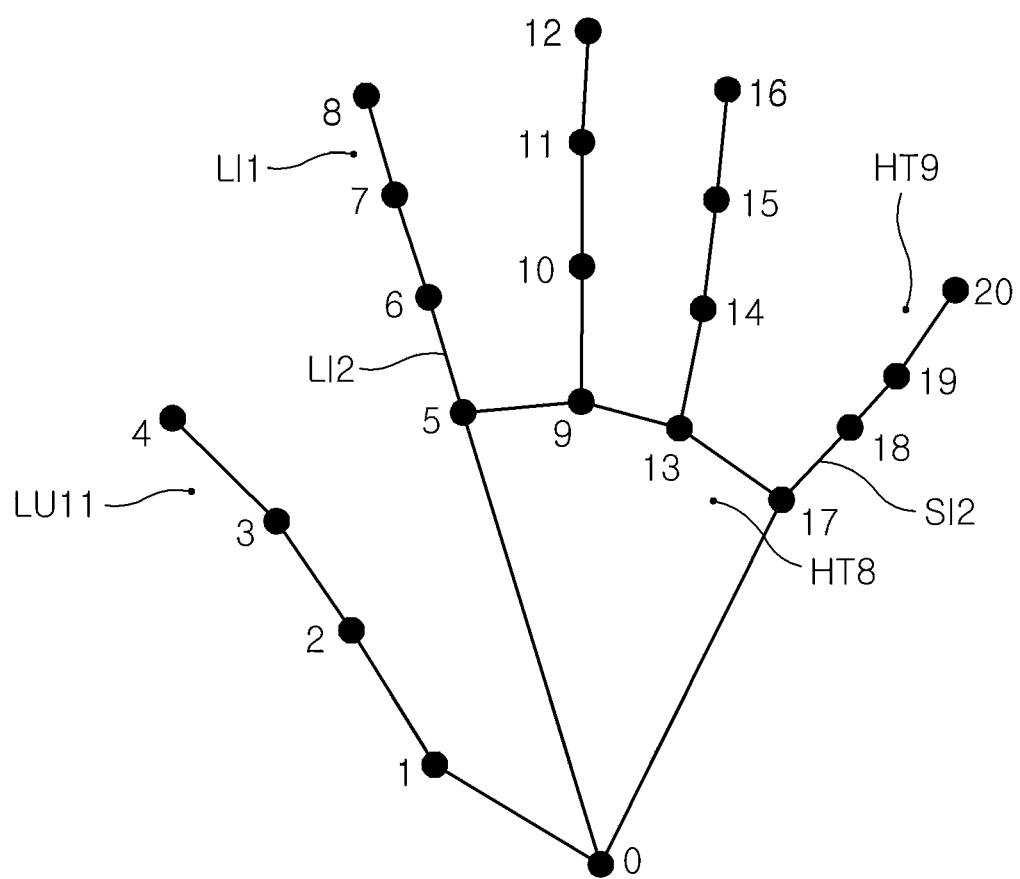
FIG. 3 is a diagram illustrating the calculation of acupuncture point location vectors for the hand in the present disclosure.

FIG. 3 is a diagram illustrating the calculation of acupuncture point location vectors for the hand in the present disclosure.

Referring to FIG. 3, for example, when the converted joint point location vectors for the hand are given as 0, 1, 2, 3, . . . as shown in FIG. 3, the acupuncture point location determination unit 140 may calculate acupuncture point location vectors LI1, LI2, LU11, HT9, SI2, HT8, . . . with reference to table information about the sum, inner division, outer division, or inner product of the joint point location vectors in the database 141. In the drawing, LI1 indicates the "Sangyang acupoint", LI2 indicates the "Igan acupoint", LU11 indicates the "Sosang acupoint", HT9 indicates the "Sochung acupoint", SI2 indicates the "Jeongok acupoint", and HT8 indicates the "Sobu acupoint".

The acupuncture point location determination unit 140 may analyze the locational relationship of joint point location vectors to distinguish the subject body, for example, the palm, the back of the hand, the inner edge of the hand, and the outer edge of the hand, and the like in the case of the hand, and determine the respective locations of acupuncture points thereof, and may also determine the locations of acupuncture points locations such that acupuncture points are not displayed depending on the exposure level of each hand on the display.

In FIG. 3, for example, the acupuncture point location determination unit 140 may distinguish the palm, the back of the hand, the inner edge of the hand, the outer edge of the hand, and the like to calculate acupuncture point location vectors using Equation 1 below. Here, joint2.x is the x-coordinate of joint point location vector 2, joint5.x is the x-coordinate of joint point location vector 5, joint5.z is the z-coordinate of joint point location vector 5, and joint17.z is the z-coordinate of joint point location vector 17.

$R1 = joint2.x - joint5.x$ $R2 = joint5.z$ $R3 = joint17.z$ [Equation 1]

Here, the acupuncture point location determination unit 140 may distinguish the palm, the back of the hand, the inner edge of the hand, and the outer edge of the hand as follows. That is, if R1<0 and R2<0, it may be identified as the palm of the hand, if R1>0 and R3<0, it may be identified as the back of the hand, if R1<0 and R2>0, it may be identified as the inner edge, and if R1>0 and R3>0, it may be identified as the outer edge. Table information such as equations above may be stored in the database 141.

In addition, the acupuncture point location determination unit 140 may also calculate the locations of LI1 indicating the "Sangyang acupoint", LI2 indicating the "Igan acupoint", LU11 indicating the "Sosang acupoint", HT9 indicating the "Sochung acupoint", SI2 indicating the "Jeongok acupoint", and HT8 indicating the "Sobu acupoint" using equations defined as the sum, inner division, outer division, or inner product of joint point location vectors, that may be maintained as table information in the database 141.

For example, the location of HT8 (Sobu acupoint) corresponds to an internal division point that internally divides the midpoint of locations of vectors 13 and 17 and the location of vector 0 in a ratio of 1:5. SI2 (Jeongokh acupoint) corresponds to an internal division point that internally divides the locations of vectors 17 and 18 in a ratio of 4:1.

LI2 (Igan acupoint) corresponds to an internal division point that internally divides the locations of vectors 5 and 6 in a ratio of 1:5. LU11 (Sosang acupoint) corresponds to a point located vertically from the midpoint of ½ of the line segment connecting locations of vectors 4 and 3.

In this way, hundreds to thousands of official standard locations of acupuncture points published by WHO/WPRO (World Health Organization/Western Pacific Regional Office) and determined by the oriental medical doctors and the oriental medicine community in the three countries of Korea, China, and Japan may be determined and displayed.

Figure 4:
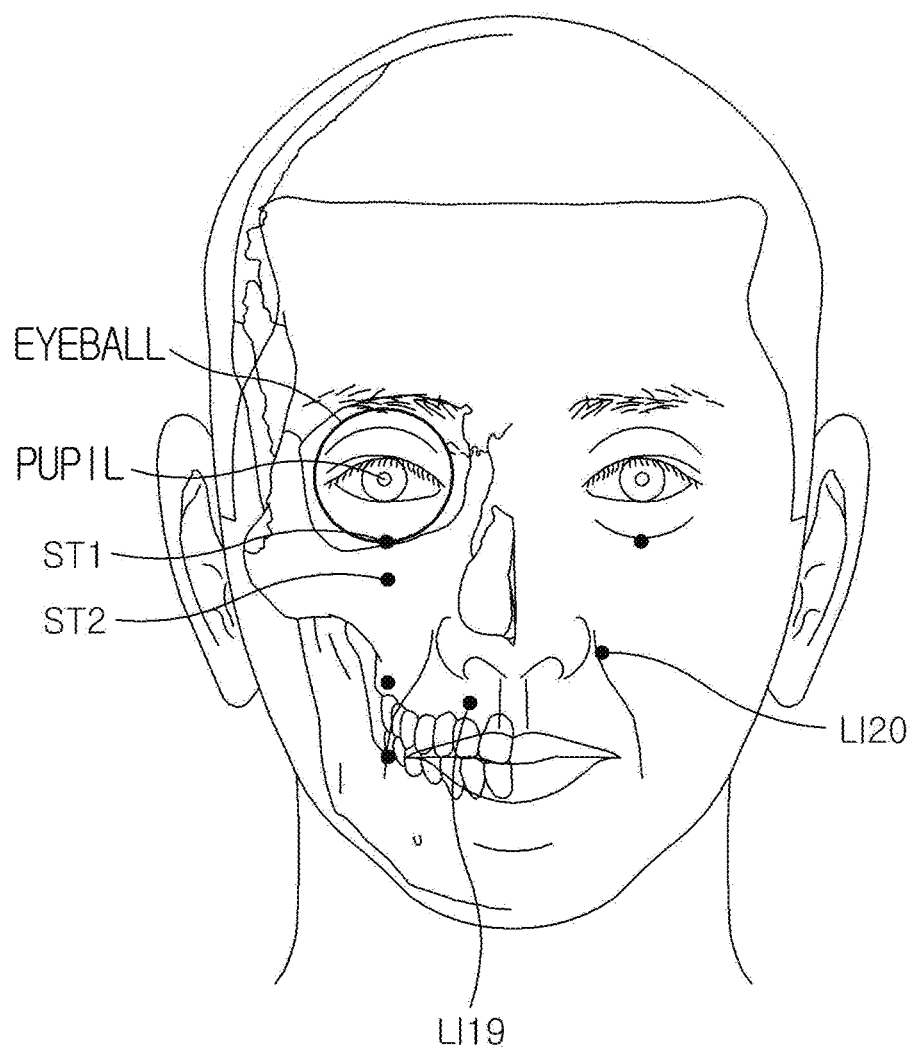
FIG. 4 is a diagram illustrating the calculation of acupuncture point location vectors for the face in the present disclosure.

FIG. 4 is a diagram illustrating the calculation of acupuncture point location vectors for the face in the present disclosure.

Referring to FIG. 4, for example, if the converted joint point location vectors for the face are given as several points shown in FIG. 4 (only a few points are indicated for convenience of explanation), the acupuncture point location determination unit 140 may calculate acupuncture point location vectors ST1, ST2, LI19, LI20, . . . with reference to table information about the sum, inner division, outer division, or inner product of joint point location vectors in the database 141. In the drawing, ST1 represents the "Seungeup acupoint", ST2 represents the "Sabaek acupoint", LI19 represents "Hwaryo acupoint", and LI20 represents the "Yeonghyang acupoint".

As described above, the acupuncture point location determination unit 140 may calculate the acupuncture point location vectors with reference to information in the table of the database 141 regarding the sum, inner division, outer division, or inner product of joint point location vectors associated with the locations of acupuncture points, among the joint point location vectors of the subject body.

Figure 5:
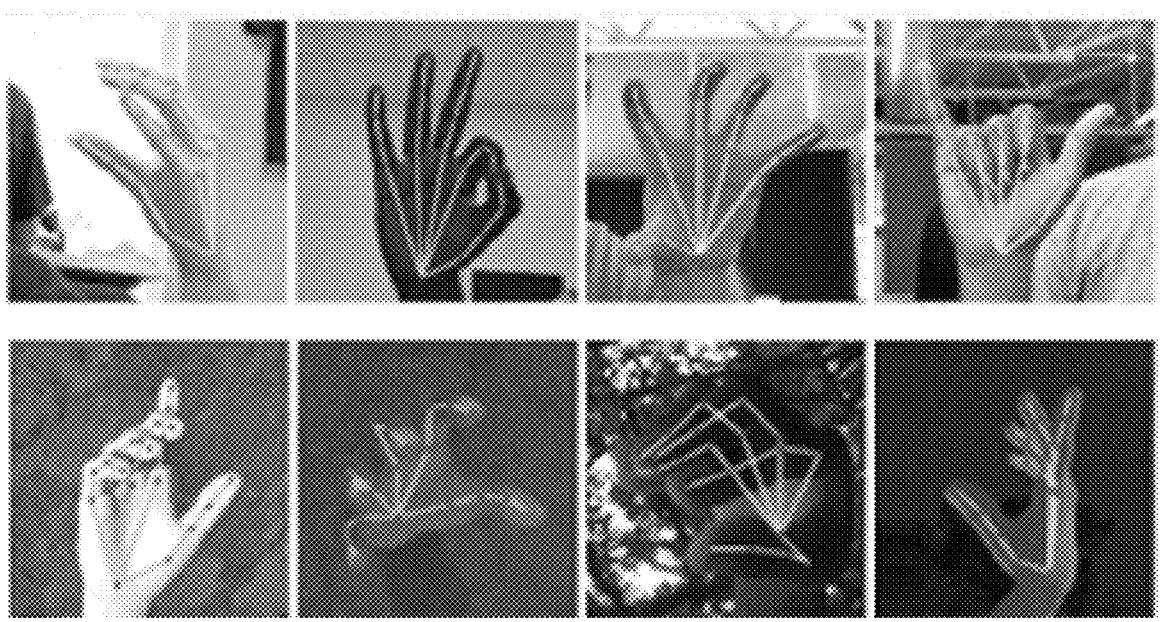
FIG. 5 illustrates video photos showing examples of displaying the locations of acupuncture points for the hand along with a subject image in augmented reality in the present disclosure.
Figure 6:
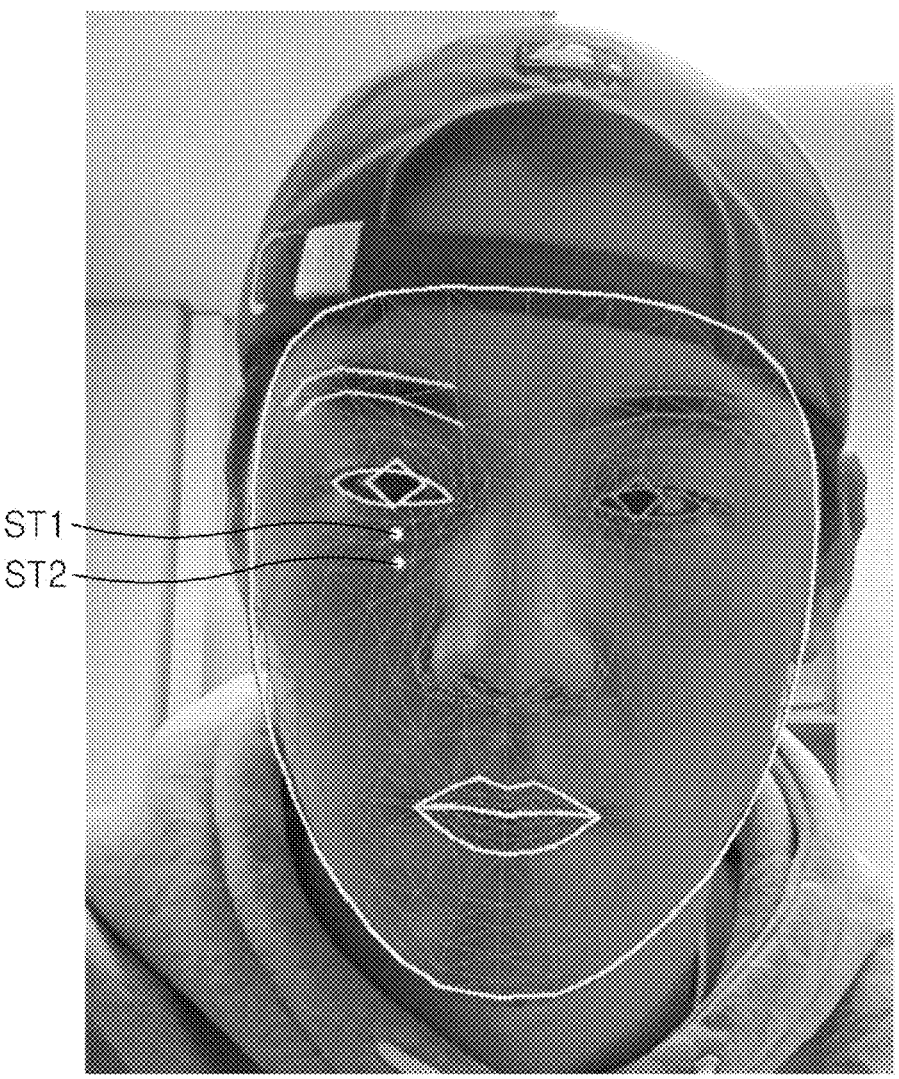
FIG. 6 illustrates video photos showing examples of displaying the locations of acupuncture points for the face along with a subject image in augmented reality in the present disclosure.
Figure 7A:
FIGS. 7A, 7B, 7C and 7D illustrate video photos showing examples of displaying the locations of acupuncture points for the arm and torso along with subject images in augmented reality.
Figure 7A:
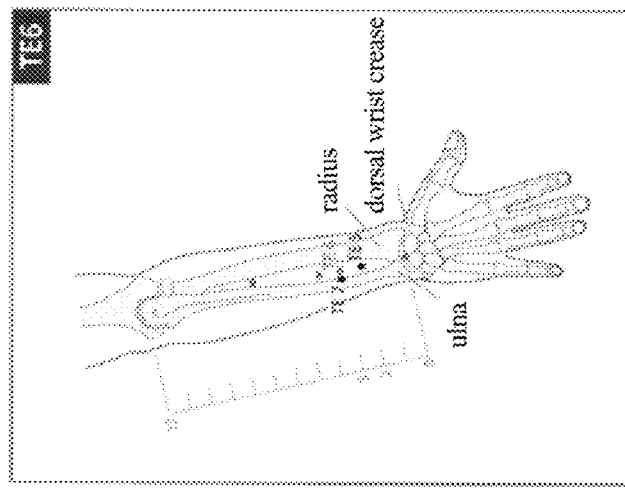
Figure 7B:
Figure 7B:
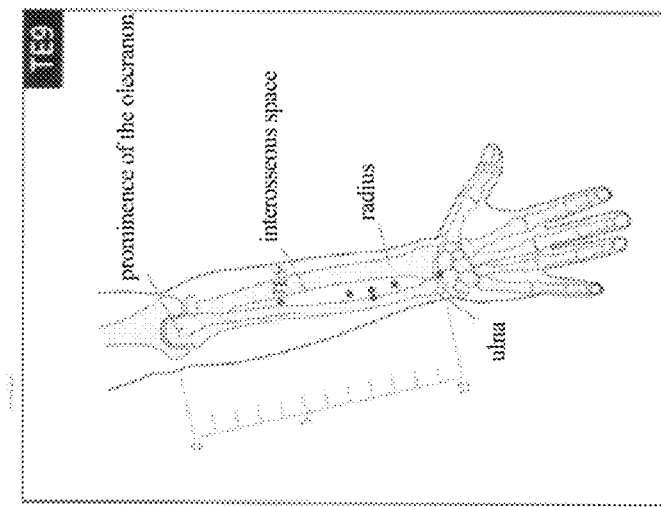
Figure 7C:
Figure 7D:
Figure 7D:
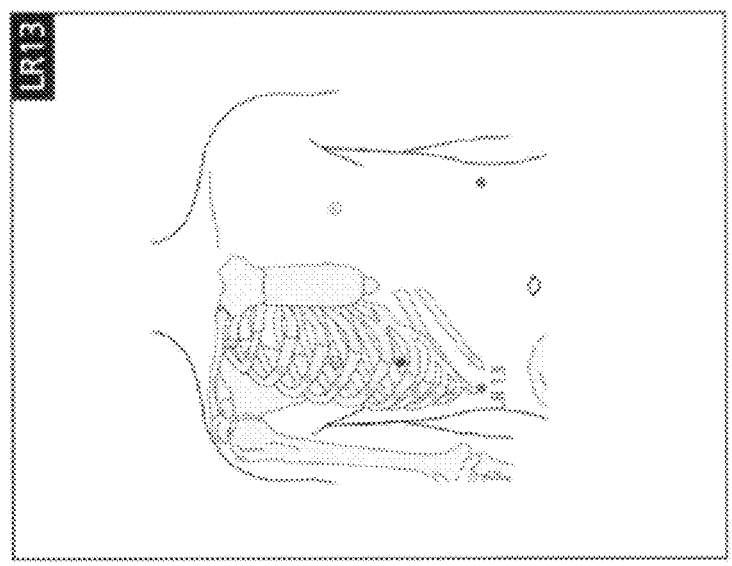

The augmented-reality display unit 150 may display, on the display on which the subject image is displayed, the locations of acupuncture points in real time according to the acupuncture point location vectors on the subject body, such as the hand, face, or the like of the subject image, in augmented reality as shown in FIGS. 5 and 6.

FIG. 5 illustrates video photos showing examples of displaying the locations of acupuncture points for the hand along with a subject image in augmented reality in the present disclosure. As shown in the photos illustrated in FIG. 5, the locations of acupuncture points may be displayed in real time on the subject body (e.g., hand) of the subject image for displaying the locations of acupuncture points in augmented reality.

FIG. 6 illustrates video photos showing examples of displaying the locations of acupuncture points for the face along with a subject image in augmented reality in the present disclosure. As shown in the photos of the display screen illustrated in FIG. 6, the locations of acupuncture points ST1, ST2, . . . may be displayed in real time on the subject body (e.g., face) of the subject image for displaying the locations of acupuncture points in augmented reality.

FIGS. 7A to 7D illustrate video photos showing examples of displaying the locations of acupuncture points for the arm and torso along with subject images in augmented reality. As shown in the photos of the display screen illustrated in FIGS. 7A to 7D, the locations of acupuncture points TE6 (Jigu acupoint), TE9 (Sadok acupoint), TE5 (Oekwan acupoint), LR13 (Jangmun acupoint), . . . calculated through vector calculation of joint points such as an elbow joint, wrist joint, rib, etc. of the subject image may be displayed in augmented reality. For example, TE6 (Jigu acupoint) may correspond to the location that internally divides the length between the elbow joint and the wrist joint in a ratio of 3:1, TE9 (Sadok acupoint) may correspond to the location that internally divides the length between the elbow joint and the wrist joint in a ratio of 1:2, and TE5 (Oekwan acupoint) may correspond to the location that internally divides the length between the elbow joint and the wrist joint in a ratio of 5:1.

Furthermore, as the subject body (e.g., hand, face, or the like) of the subject image changes on the display on which the subject image is displayed as shown in FIGS. 5, 6, and 7A to 7D (e.g., location changes, shape changes, size changes, etc. due to movement), the augmented-reality display unit 150 may covert the acupuncture point location vectors (e.g., movement conversion, etc.) so as to dynamically respond to the changes and display the locations of acupuncture points according to the converted acupuncture point location vectors in real time on the subject body (e.g., hand, face, etc.) of the subject image in augmented reality.

That is, in the present disclosure, when the image input unit 120 receives a moving image, since the subject body (e.g., hand, face, or the like) of the subject image changes in location, shape, size, and the like due to movement thereof, the augmented reality display unit 150 may track this to, for example, calculate conversion values of the acupuncture point location vectors for the subject body (e.g., hand, face, or the like) according to the changed location, calculate conversion values of the acupuncture point location vectors for the subject body (e.g., hand, face, or the like) according to the changed shape, and calculate conversion values of the acupuncture point location vectors for the subject body (e.g., hand, face, or the like) according to the changed size. Through this, while following the subject body (e.g., hand, face, or the like) of the subject image, the locations of acupuncture points may be displayed on the subject body (e.g., hand, face, or the like) of the subject image according to the converted acupuncture point location vectors in augmented reality.

Figure 8:
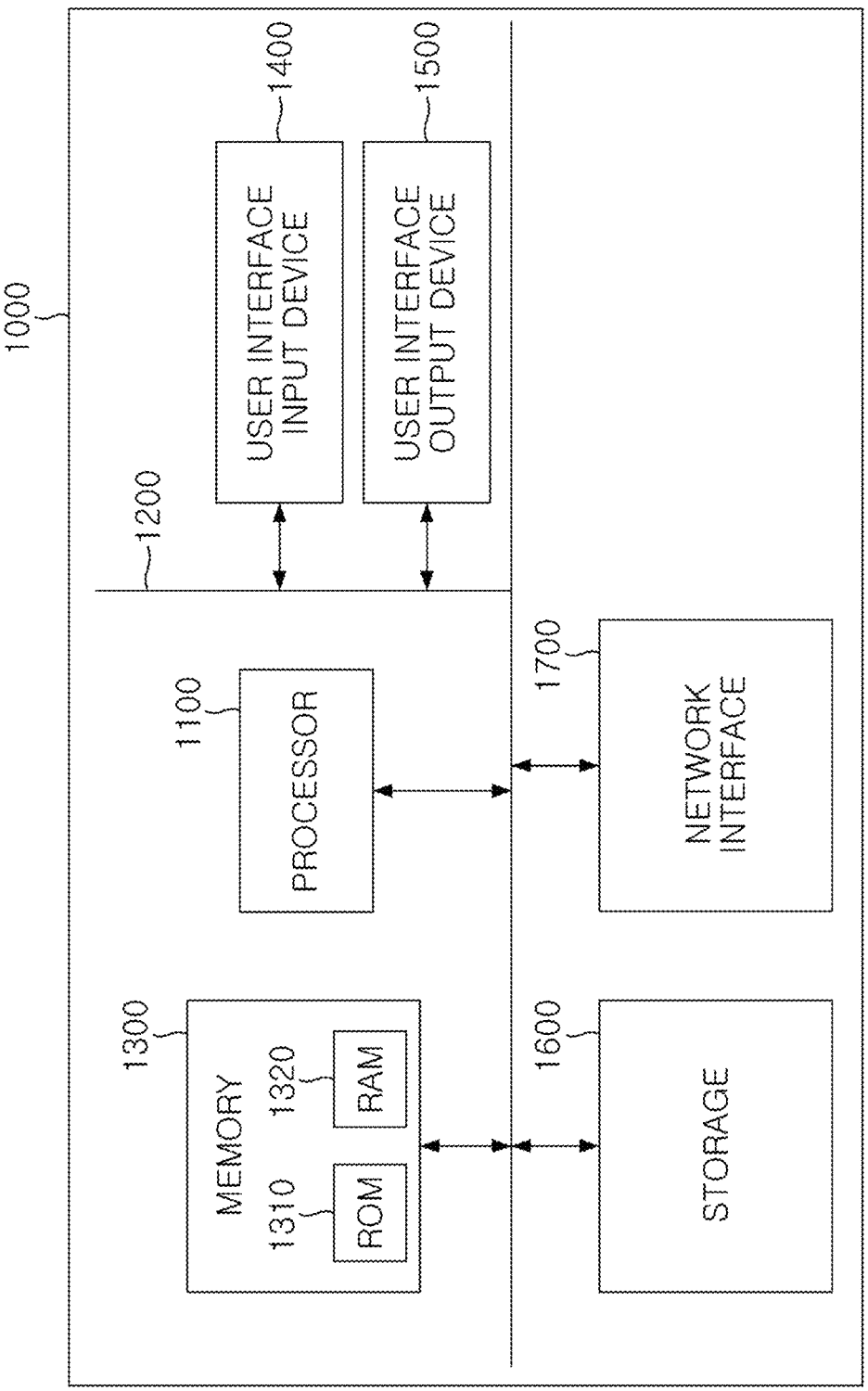
FIG. 8 is a diagram illustrating an example of a method of implementing an acupuncture point location display device that processes an acupuncture point location display method according to an embodiment of the present disclosure.

FIG. 8 is a diagram illustrating an example of a method of implementing an acupuncture point location display device that processes an acupuncture point location display method according to an embodiment of the present disclosure.

Referring to FIG. 8, the acupuncture point location display device that performs the acupuncture point location display method according to an embodiment of the present disclosure may be configured as hardware, software, or a combination thereof. For example, the acupuncture point location display device of the present disclosure may be implemented as the computing system 1000 shown in FIG. 8 or a server on the Internet having at least one processor for performing the above functions/steps/processes.

The computing system 1000 may include at least one processor 1100, a memory 1300, a user interface input device 1400, a user interface output device 1500, a storage 1600, and a network interface 1700, which are connected through a bus 1200. The processor 1100 may be a central processing unit (CPU) or a semiconductor device that executes instructions stored in the memory 1300 and/or storage 1600. The memory 1300 and storage 1600 may include various types of volatile or non-volatile storage media. For example, the memory 1300 may include a read-only memory (ROM) 1310 and a random access memory (RAM) 1320. In addition, the network interface 1700 may include a communication module such as a modem or the like that supports wired Internet communication, wireless Internet communication such as Wi-First, WiBro, and the like, or mobile communication such as WCDMA, LTE, and the like, or a communication module such as a modem or the like that supports short-range wireless communication schemes (e.g., Bluetooth, ZigBee, Wi-Fi, or the like) in user terminals such as smartphones, laptop PCs, desktop PCs, and the like.

Accordingly, steps of a method or algorithm described in connection with the embodiments disclosed herein may be implemented directly in hardware, software modules, or a combination thereof executed by the processor 1100. The software module may reside in a non-transitory storage/recording medium (i.e., the memory 1300 and/or the storage 1600) readable by a computer or device, such as RAM memory, flash memory, ROM memory, EPROM memory, EEPROM memory, registers, hard disks, removable disks, and CD-ROM. The exemplary storage medium may be coupled to a processor 1100, and the processor 1100 may read and write information (code) from and to the storage medium. Alternatively, the storage medium may be integrated with processor 1100. The processor and storage medium may reside in an application specific integrated circuit (ASIC). The ASIC may reside in the user terminal. Alternatively, the processor and storage medium may reside as separate components in the user terminal.

As described above, according to the method of displaying locations of acupuncture points according to the present disclosure, it is possible to convert the sizes of joint points from an artificial intelligence deep-learning model (e.g., MediaPipe, which is one of the Human Pose Estimation models, or the like) to fit the subject's body, calculate standard locations of acupuncture points, which are determined by the World Health Organization/Western Pacific Regional Office (WHO/WPRO), on the hands, feet, face, body, etc. through vector calculation of the joint points, and display the same in augmented reality on the subject's body through a real-time image, so that the experts such as oriental medicine doctors and the like may easily use this for diagnosis and treatment.

As described above, when the locations of acupuncture points are quantified to be customized and scientifically provided to the experts such as oriental medicine doctors and the like, it is easier to determine the locations of acupuncture points, and if the acupuncture points are displayed through a real-time image for education of new oriental medical doctors and the like, it may be a great help in establishing the concept of standard acupuncture points more clearly. It is also expected to help with quantification and scientification of oriental medicine, which are weak areas thereof.

As described above, although the present disclosure has been described by limited embodiments and drawings including details such as specific elements, this is provided only to facilitate general understanding of the present disclosure, and the present disclosure is not limited to the above embodiments, and those of ordinary skill in the art to which the present disclosure pertains will be able to make various modifications and variations without departing from the essential characteristics of the present disclosure. Therefore, the spirit of the present disclosure should not be limited to the described embodiments, and all technical ideas equivalent to the claims and having equivalent changes thereof, as well as the claims described later, should be interpreted as being included in the scope of the present disclosure.

What is claimed is:

1. A method of displaying locations of acupuncture points for a subject in an acupuncture point location display device, the method comprising: receiving a subject image;
receiving joint point location vectors of a subject body from a joint model;
converting the joint point location vectors to correspond to the size of the subject body of the subject image on a display where the subject image and the joint point location vectors are displayed;
calculating acupuncture point location vectors for the converted joint point location vectors with reference to a table in a database; and
displaying locations of acupuncture points according to the acupuncture point location vectors in real time on the body of the subject image in augmented reality on a display on which the subject image is displayed,
wherein the calculating of the acupuncture point location vectors comprises calculating the acupuncture point location vectors with reference to information about the sum, inner division, outer division, or inner product of joint point location vectors associated with corresponding locations of acupuncture points, among the joint point location vectors, in the table of the database.

2. The method of claim 1, wherein the joint model is an artificial intelligence deep-learning model in which the joint point location vectors are machine-learned for multiple human bodies by operating a library to provide the joint point location vectors, and provides the joint point location vectors according to a request of the acupuncture point location display device.

3. The method of claim 1, wherein the displaying in augmented reality comprises converting the acupuncture point location vectors so as to dynamically respond to changes in the subject body of the subject image on the display where the subject image is displayed and displaying the locations of acupuncture points according to the converted acupuncture point location vectors in real time on the body of the subject image in augmented reality.

4. The method of claim 1, wherein the joint point location vectors and the acupuncture point location vectors are vectors on a three-dimensional rectangular coordinate system.

5. A non-transitory computer-readable storage medium storing computer executable instructions for performing a function of displaying locations of acupuncture points for a subject in an acupuncture point location display device, the storage medium implementing:
a function of receiving joint point location vectors of a subject body from a joint model;
a function of receiving a subject image;
a function of converting the joint point location vectors to correspond to the size of the subject body of the subject image on a display where the subject image and the joint point location vectors are displayed;
a function of calculating acupuncture point location vectors for the converted joint point location vectors with reference to a table in a database; and
a function of displaying locations of acupuncture points according to the acupuncture point location vectors in real time on the subject body of the subject image in augmented reality on a display on which the subject image is displayed,
wherein the function of calculating the acupuncture point location vectors comprises calculating the acupuncture point location vectors with reference to information about the sum, inner division, outer division, or inner product of joint point location vectors associated with corresponding locations of acupuncture points, among the joint point location vectors, in the table of the database.

6. The storage medium of claim 5, wherein the joint model is an artificial intelligence deep-learning model in which the joint point location vectors are machine-learned for multiple human bodies by operating a library to provide the joint point location vectors, and provides the joint point location vectors according to a request of the acupuncture point location display device.

7. The storage medium of claim 5, wherein the function of displaying in augmented reality comprises converting the acupuncture point location vectors so as to dynamically respond to changes in the subject body of the subject image on the display where the subject image is displayed and displaying the locations of acupuncture points according to the converted acupuncture point location vectors in real time on the subject body of the subject image in augmented reality.

8. The storage medium of claim 5, wherein the joint point location vectors and the acupuncture point location vectors are vectors on a three-dimensional rectangular coordinate system.

* * * * *